US005791233A

United States Patent [19]

Knapp et al.

[11] Patent Number: 5,791,233

[45] Date of Patent: Aug. 11, 1998

[54] LIFTING COLUMN WITH TELESCOPING GUIDES

[76] Inventors: Jürgen Michael Knapp, Heinrich-Heine-Strasse 10, D-93138 Lappersdorf; Robert Geiger, Mettenerstrasse 24 Berg, D-94526 Metten, both of Germany

[21] Appl. No.: 723,879

[22] Filed: Sep. 23, 1996

[30] Foreign Application Priority Data

| | | | |
|---|---|---|---|
| Sep. 21, 1995 | [DE] | Germany | 195 35 066.9 |
| Mar. 5, 1996 | [DE] | Germany | 196 08 434.2 |
| Mar. 27, 1996 | [DE] | Germany | 196 12 091.8 |
| Jun. 13, 1996 | [DE] | Germany | 196 23 580.4 |

[51] Int. Cl.$^{6}$ .......... F16J 15/18

[52] U.S. Cl. .......... 92/165 R; 92/165 PR; 92/167; 92/161

[58] Field of Search .......... 92/165 R, 165 PR, 92/167, 27, 28, 161

[56] References Cited

U.S. PATENT DOCUMENTS

| | | | |
|---|---|---|---|
| 2,216,456 | 10/1940 | Cooke | 92/165 R |
| 2,961,837 | 11/1960 | Suderow | 92/165 R |
| 3,836,011 | 9/1974 | Sakamoto et al. | 92/165 R |
| 4,098,172 | 7/1978 | Wright et al. | 92/161 |
| 4,132,040 | 1/1979 | Grove | 92/165 R |
| 5,413,031 | 5/1995 | Kohlmeyer | 92/165 R |
| 5,609,091 | 3/1997 | Stoll | 92/165 PR |
| 5,615,598 | 4/1997 | Noroj et al. | 92/165 PR |

*Primary Examiner*—Thomas E. Denion

*Attorney, Agent, or Firm*—Hoffman, Wasson & Gitler

[57] ABSTRACT

The invention relates to a novel design of a lifting column, especially for patient tables or for industrial applications, with at least one lifting cylinder designed as a hydraulic cylinder at least for one vertical stroke and with at least one guide assigned to at least one lifting cylinder for guidance in the direction of the stroke of the lifting cylinder.

15 Claims, 17 Drawing Sheets

LIFTING COLUMN WITH TELESCOPING GUIDES

FIELD OF THE INVENTION

The invention relates to a lifting column for use with patient tables or in industrial applications. The lifting column has at least one lifting cylinder with a vertical stroke (VH) and at least one guide for the lifting cylinder in the stroke direction.

BACKGROUND OF THE INVENTION

A lifting column is already the subject of DE 43 41 779 and with a small and compact design is characterized by a large adjustment and swivelling range.

SUMMARY OF THE INVENTION

The object of the invention is to provide an improved a lifting column of this type such that while maintaining the small and compact design and a large adjustment and swivelling range it can be built especially without play and therefore especially stiffly.

To achieve the foregoing object a lifting column is provided with a guide having two telescoping sections formed as non-circular pipe sections, and lying with their axes in the direction of the stroke (VH). The lifting cylinder is housed within the pipe sections of the guide. At least one of the pipe sections has guide pieces formed therein. The guide pieces interact with the outer surface of the other pipe section, and can be adjusted in an axial direction perpendicular to the outer surface.

In one embodiment, the lifting column has at least one lifting cylinder with the pertinent guide. This guide is formed by two telescoping pipe sections which have a non-circular cross section, preferably a rectangular or square cross section. The lifting cylinder is located within the sections. The latter can be produced with a large cross section so that the lifting column can be made with low weight and using economical parts with high stiffness.

In another embodiment the lifting column overall has at least four lifting cylinders, of which at least one acts between one foot and one intermediate carrier for a vertical stroke, and of which at least three lifting cylinders act between the intermediate carrier and one upper connection at a time for a swivelling carrier or a similar functional element of a table. These latter lifting cylinders then form lifting and swivelling means, in conjunction with one joint at a time, one of these lifting and swivelling means being made such that the pertinent connection element can be swivelled around two horizontal space axes which run perpendicular to one another, can also be moved in at least one of these space axes, and at the same time can be changed for axial equalization of the distance between this connection element and other connection elements or joints.

In a lifting column according to the invention, for this purpose, one of the joints via which the second to the fourth cylinders act on the swivelling carrier is made as a swivelling, sliding and rotating joint. In this way equalization between the distances of all three joints on the swivelling carrier can be optimally achieved during any conceivable swivelling motion, so that all joints and guides can be made without play, and even in the case of larger forces acting on the swivelling carrier it does not execute any undesired additional motion, i.e., the lifting column has to some extent especially high stiffness.

In one preferred embodiment of the invention one of the three lifting cylinders acting between the intermediate carrier and an upper connection or the swivelling carrier is made as an "floating cylinder", i.e., no guide is assigned to this cylinder, but it can float or swivel for axial equalization at least around the two horizontal axes.

"Patient tables" for the purposes of the invention are, among others, operating tables and also other tables for medical purposes.

Then, for example, the actual table or the actual support for the patient is attached to the swivelling carrier, or the swivelling carrier is already a component of this support.

The swivelling carrier can be made as a plate. Basically, however, it is also possible to make the swivelling carrier produced for example as a frame structure from lengths of a hollow steel section.

Developments of the invention are the subject of the subclaims.

DETAILED DESCRIPTION OF THE DRAWINGS

The invention is detailed below using the Figures on embodiments.

Figure 6:
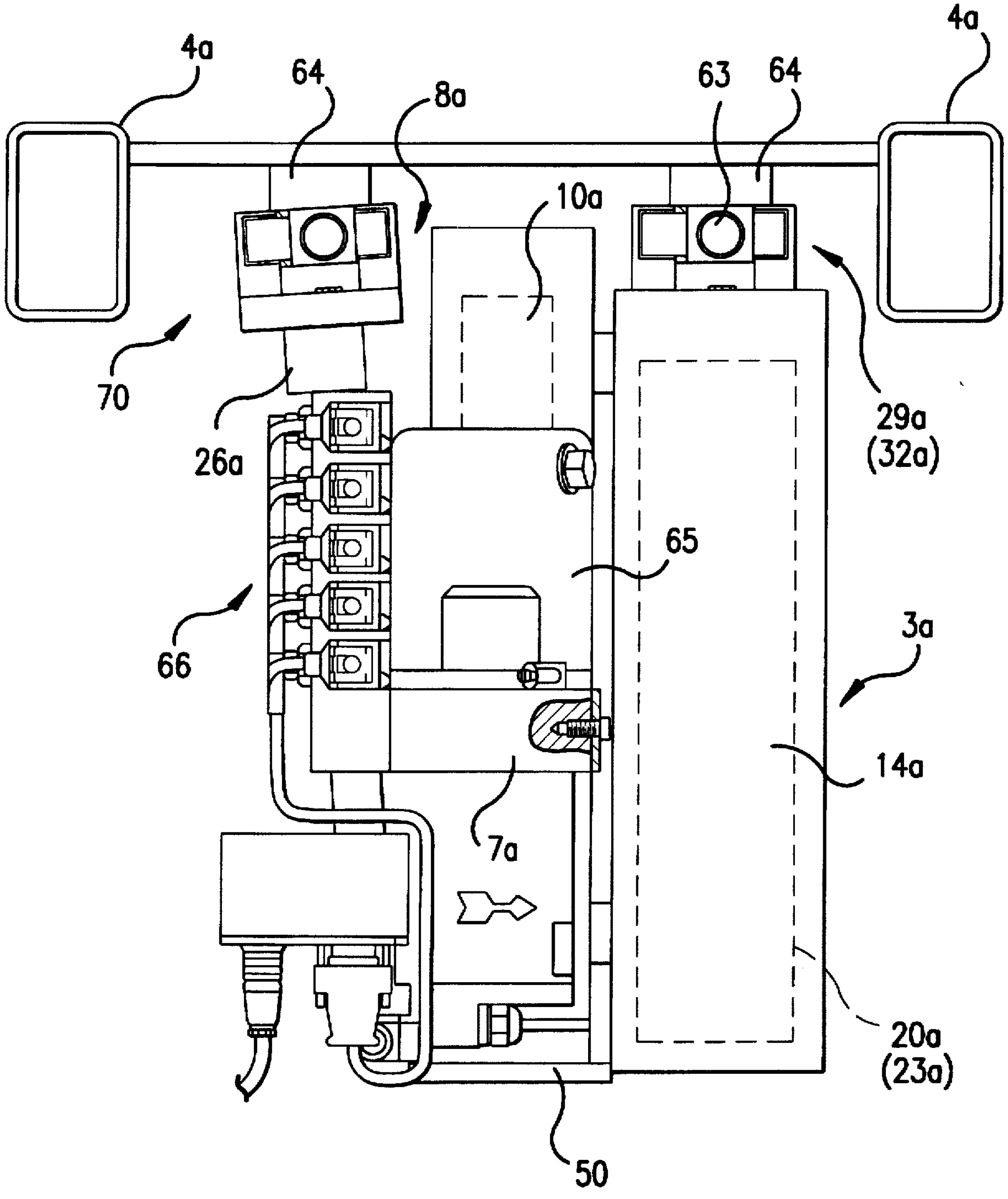
FIGS. 6 and 7 show, in two side views turned 90°, another preferred embodiment of the lifting column according to the invention in the retracted state.
Figure 7:
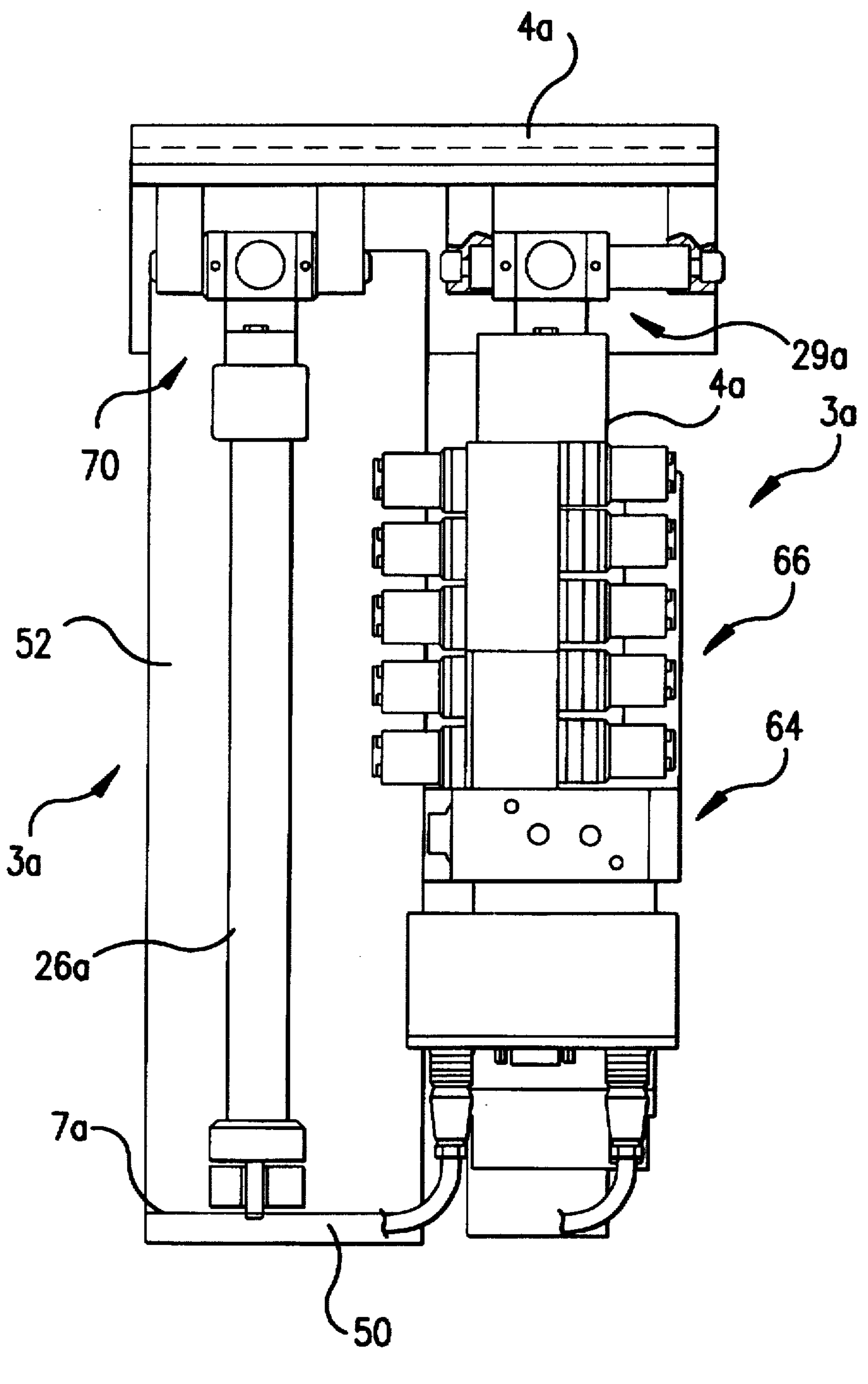
Figure 8:
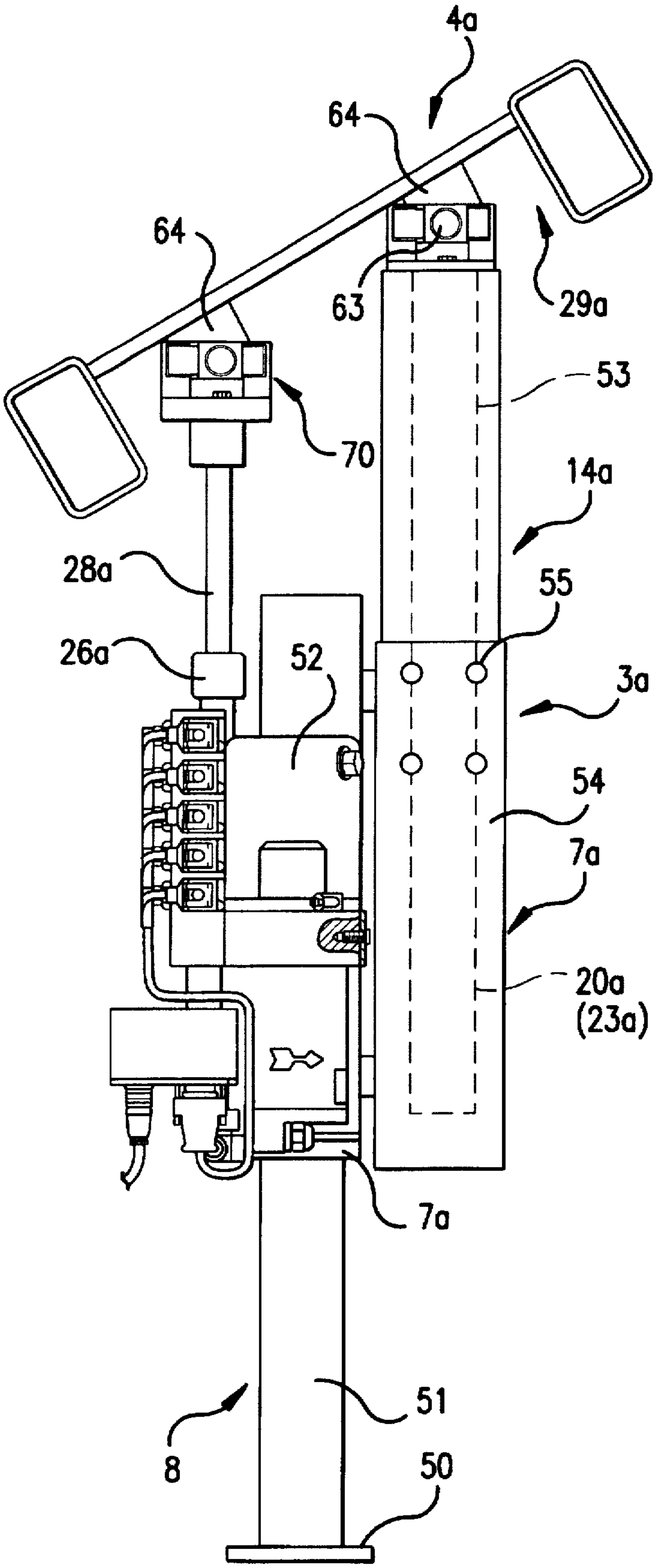
FIGS. 8 and 9 show in the representation of FIGS. 6 and 7 the lifting column in the extended state and with the swivelling carrier or frame swivelled.
Figure 10:
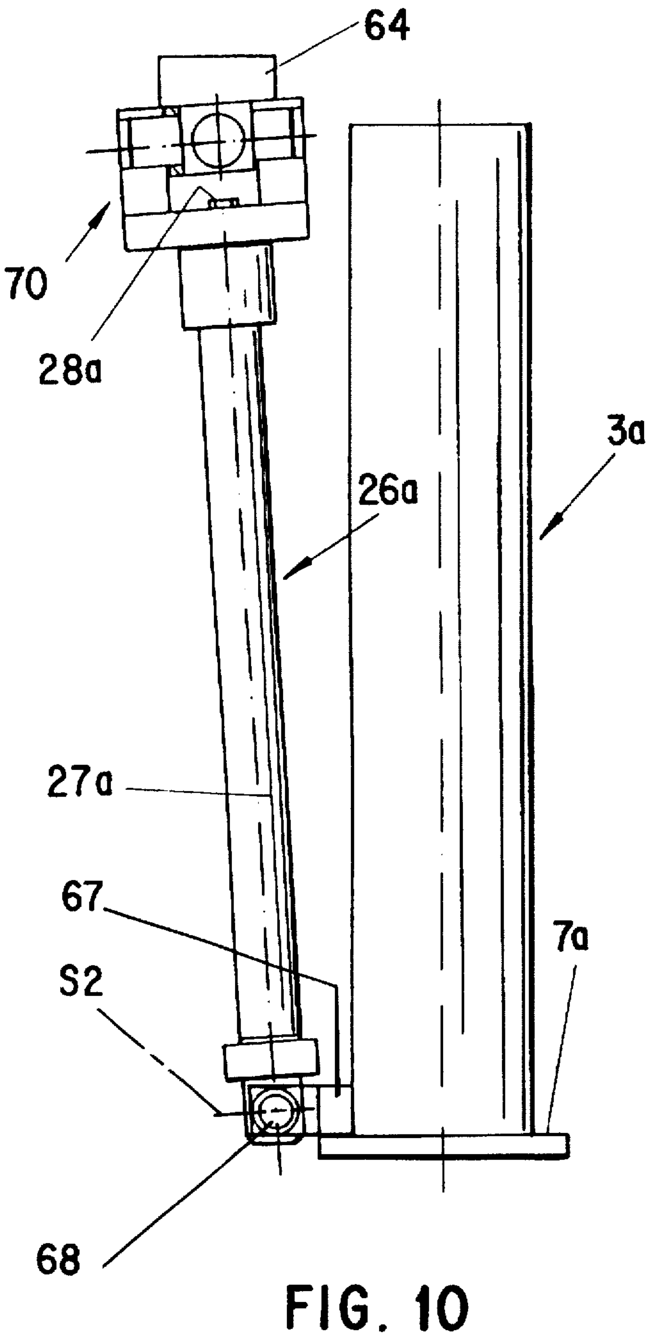
Figure 11:
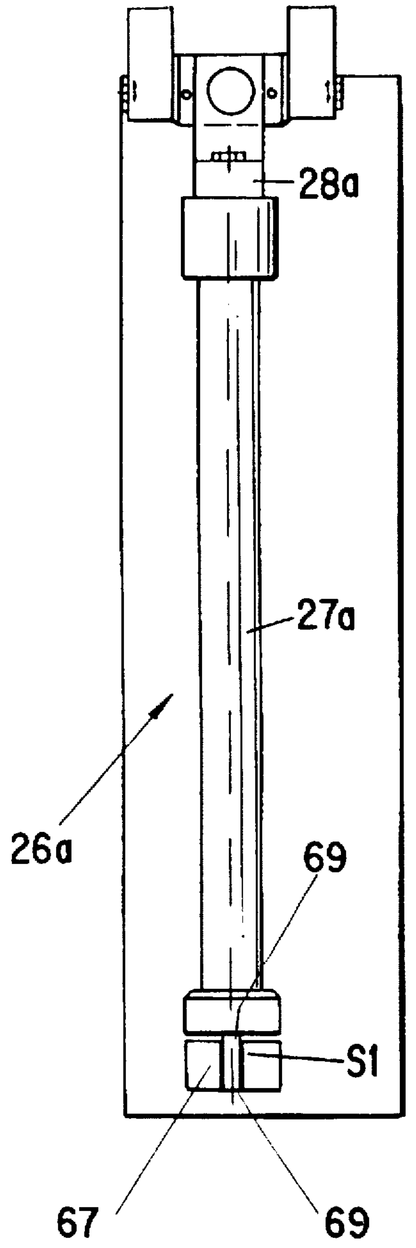
Figure 12:
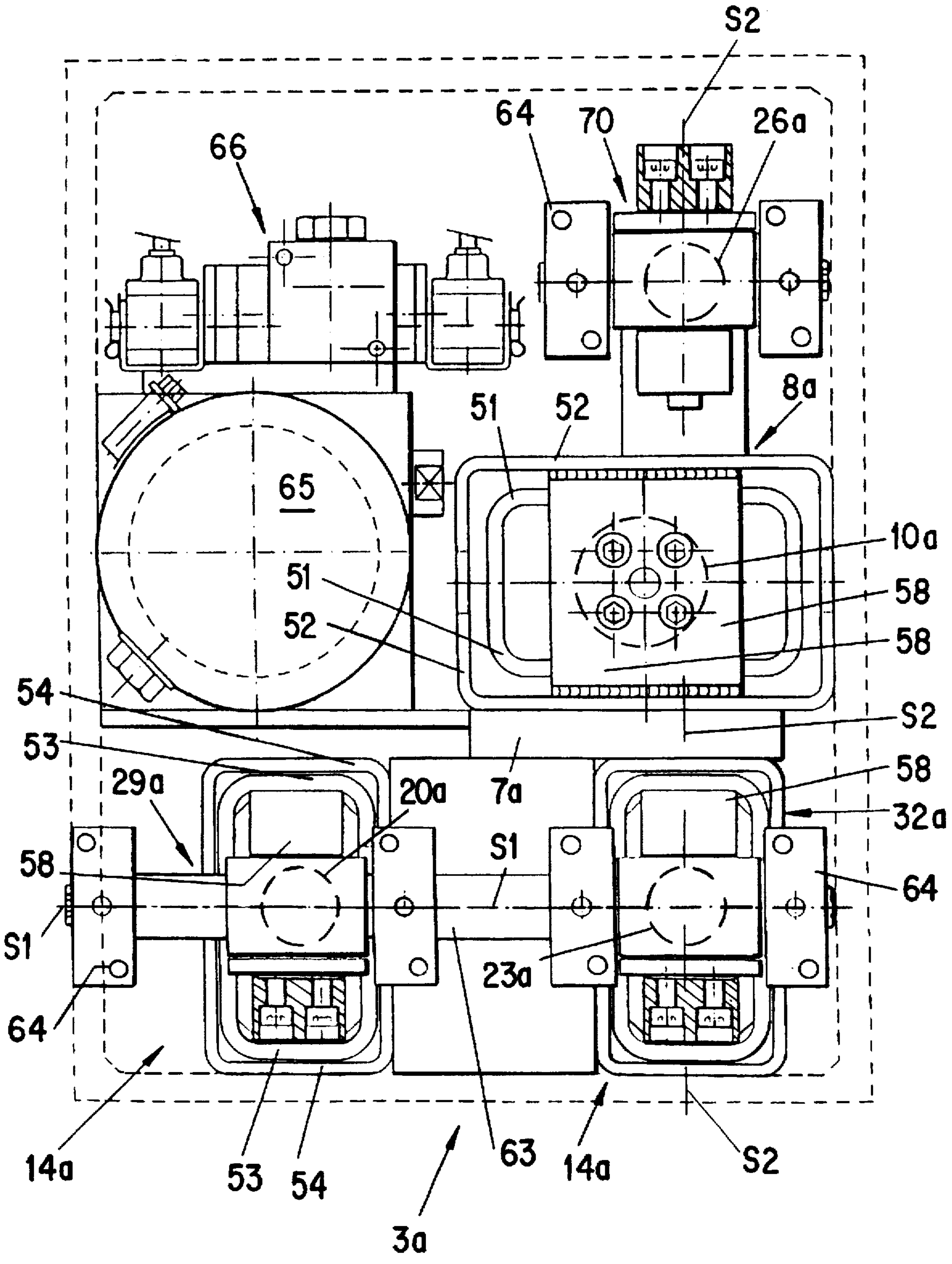
Figure 13:
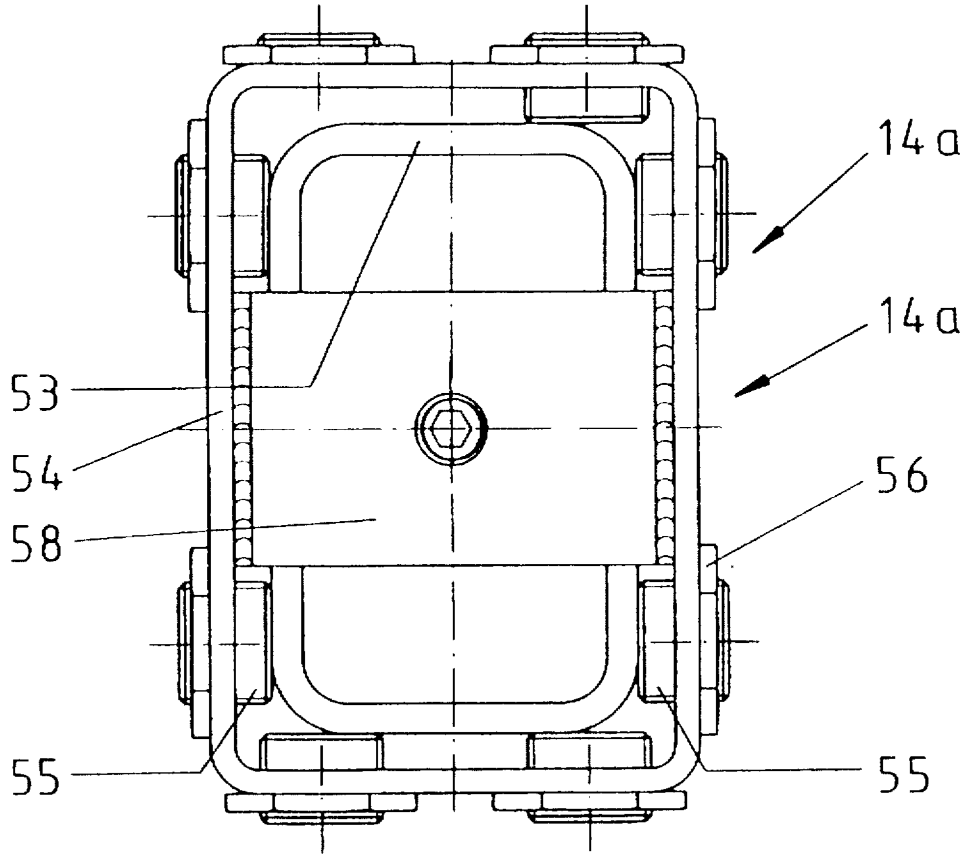
Figure 14:
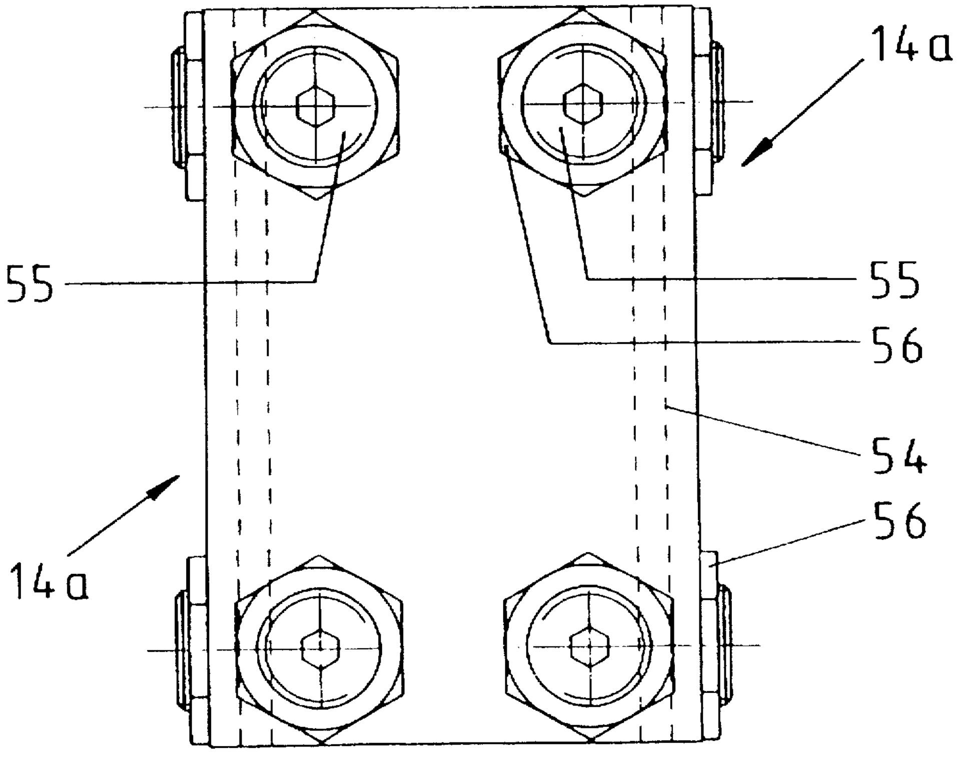
Figure 15:
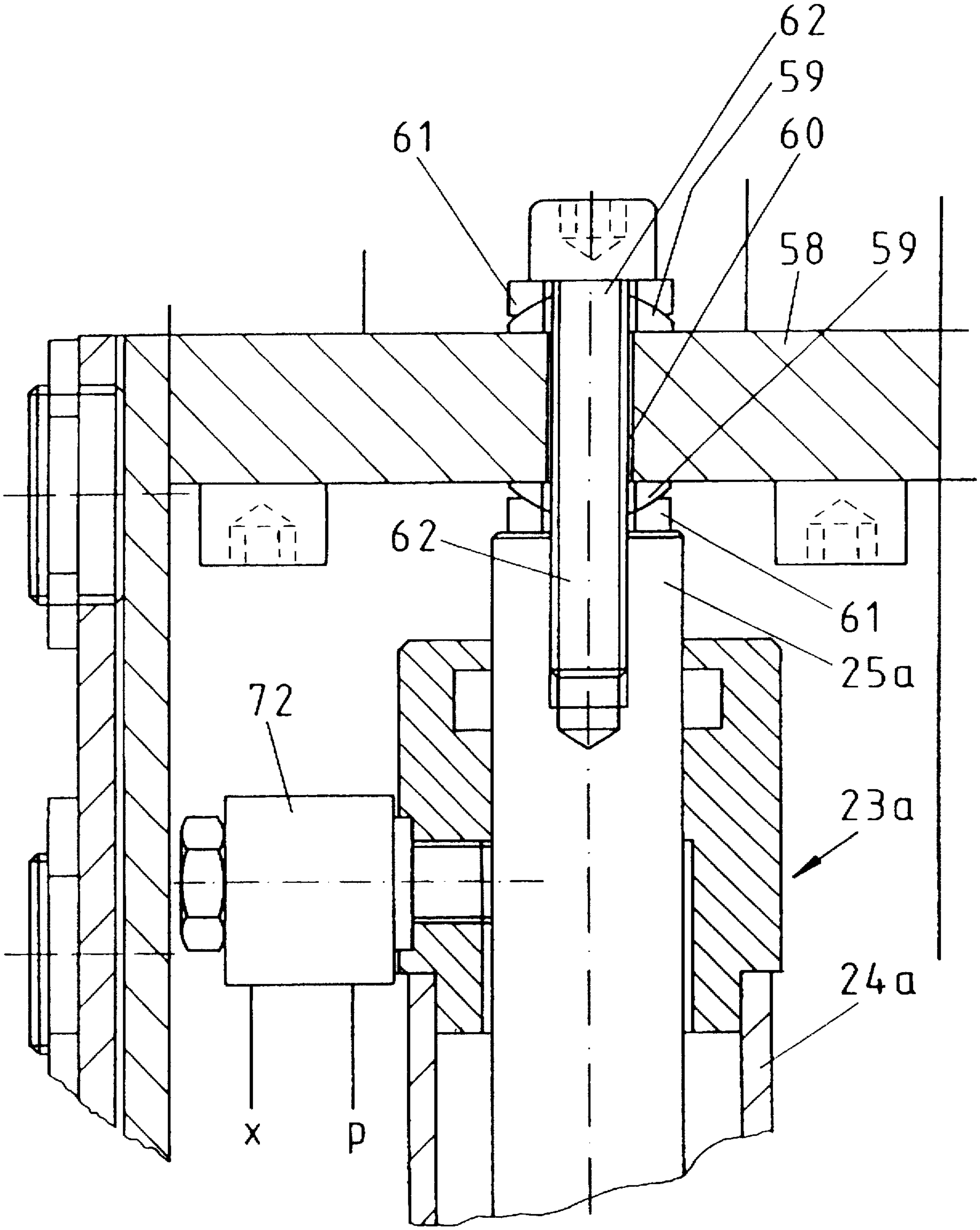
Figure 16:
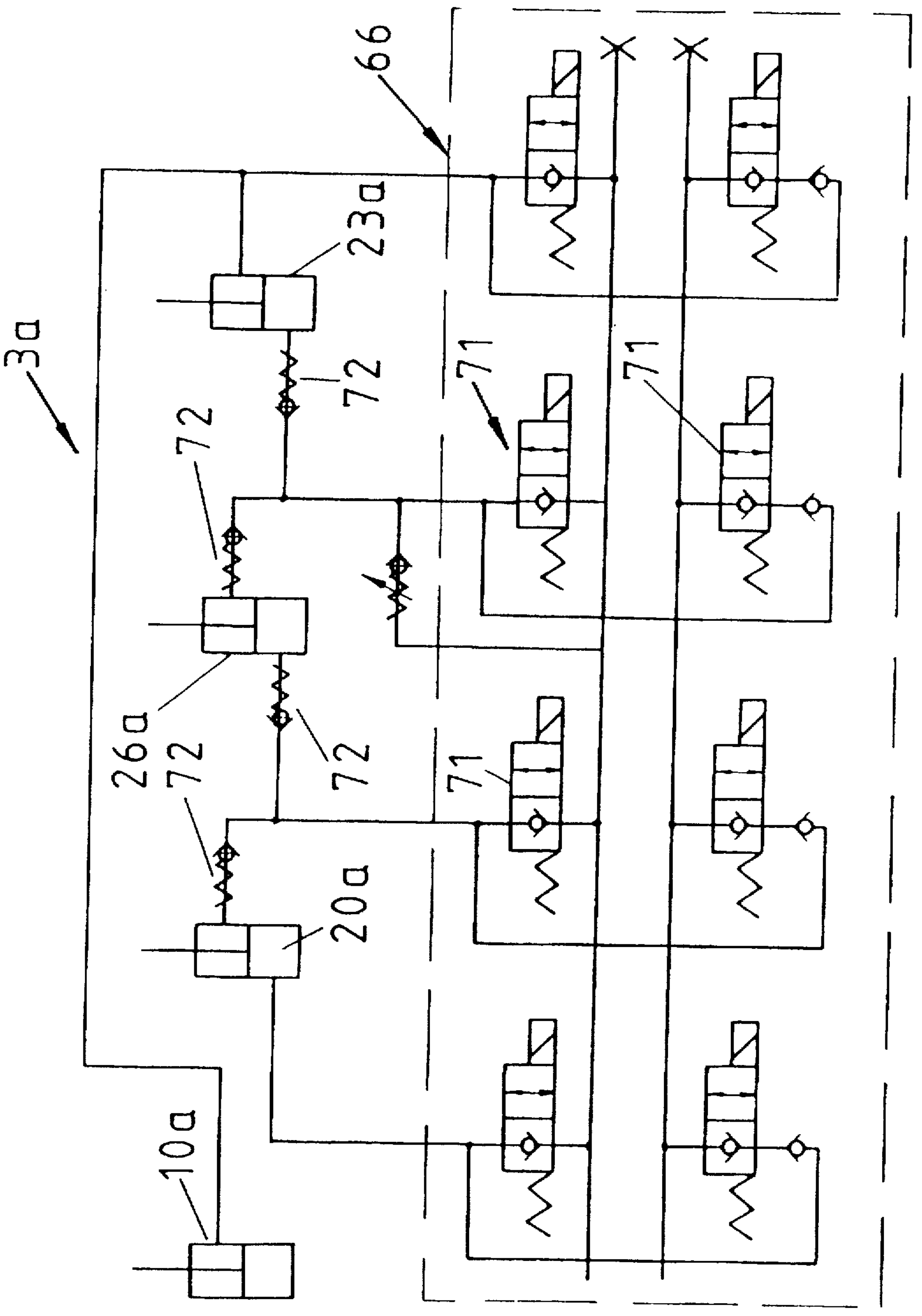
Figure 17:
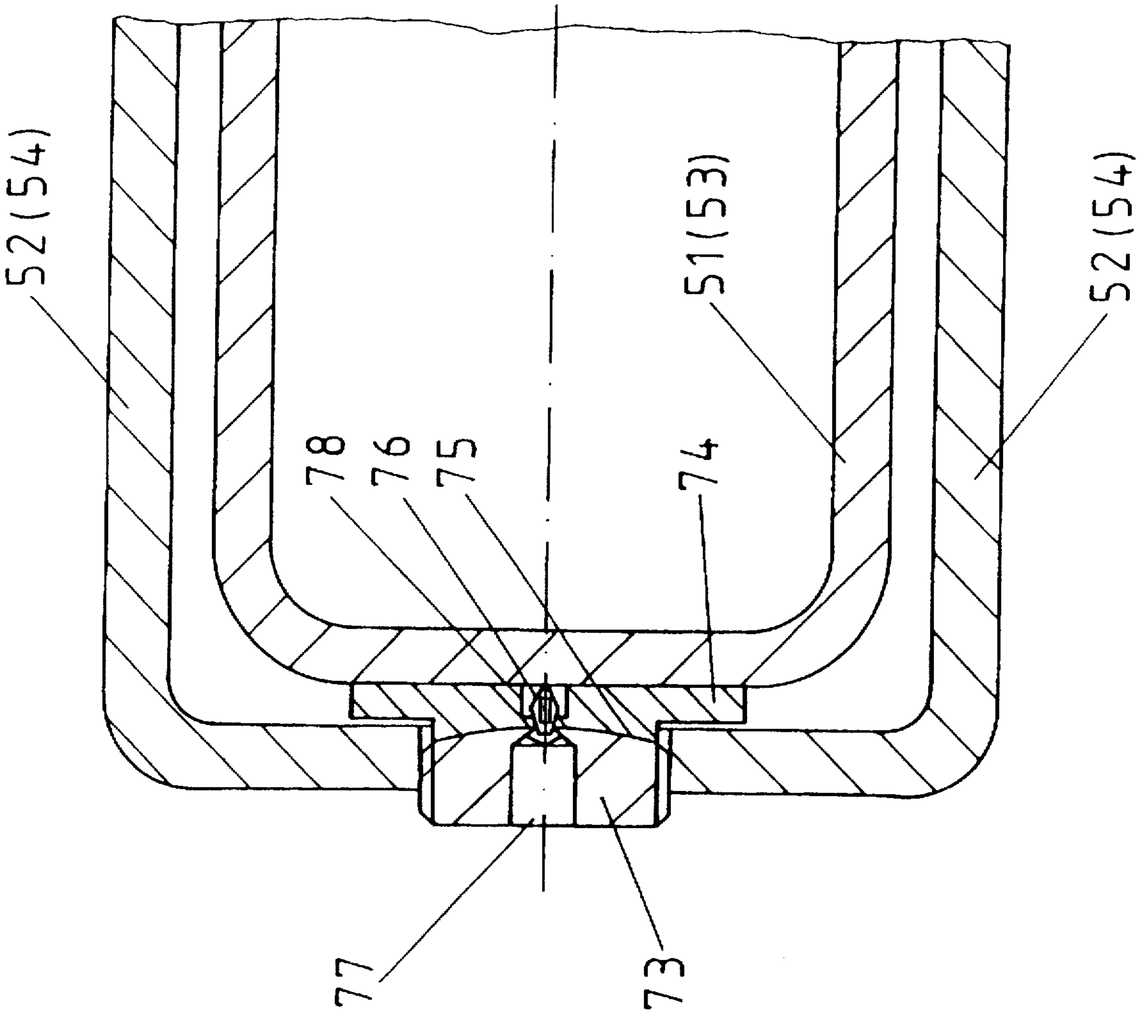
Figure 18:
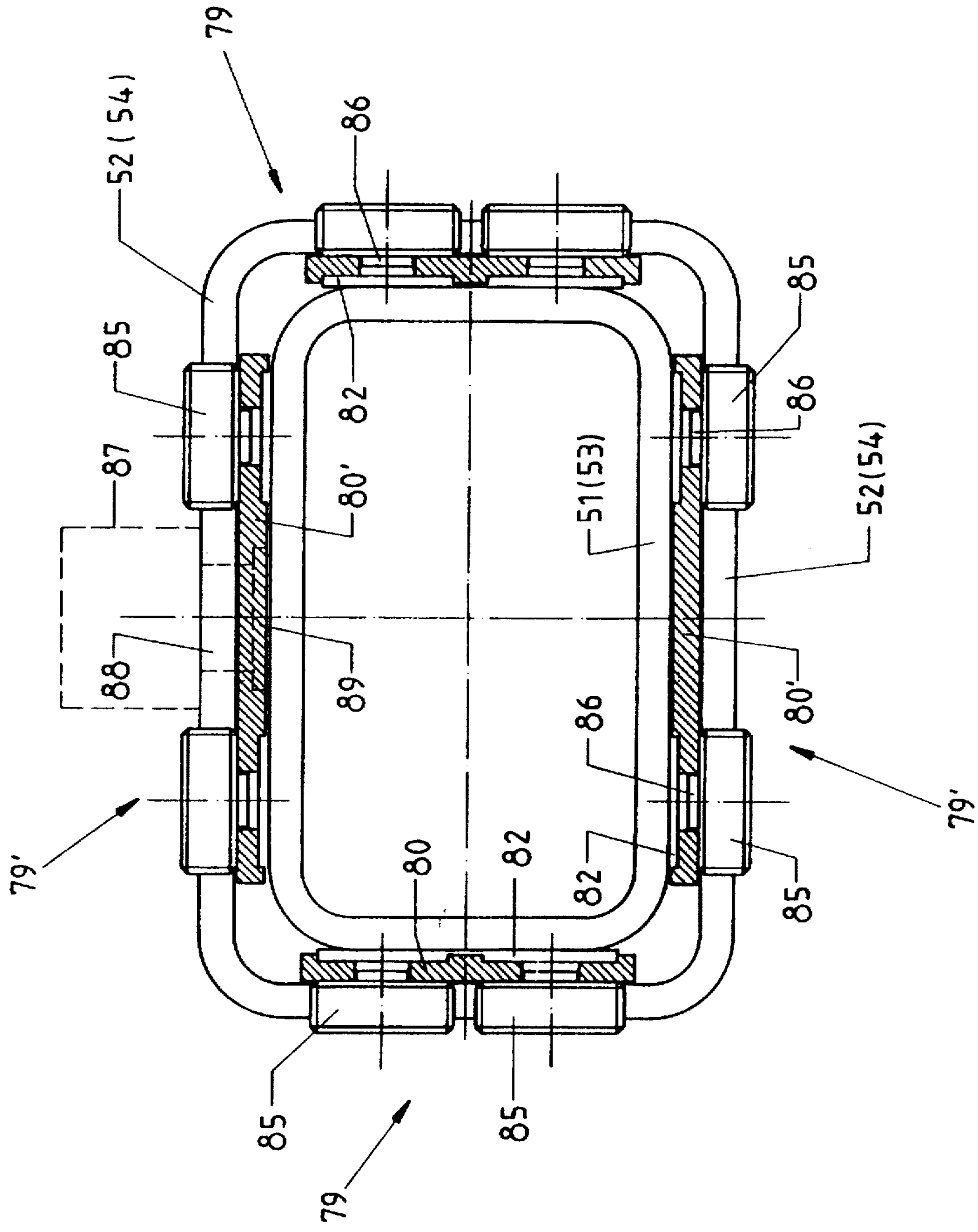
Figure 20:
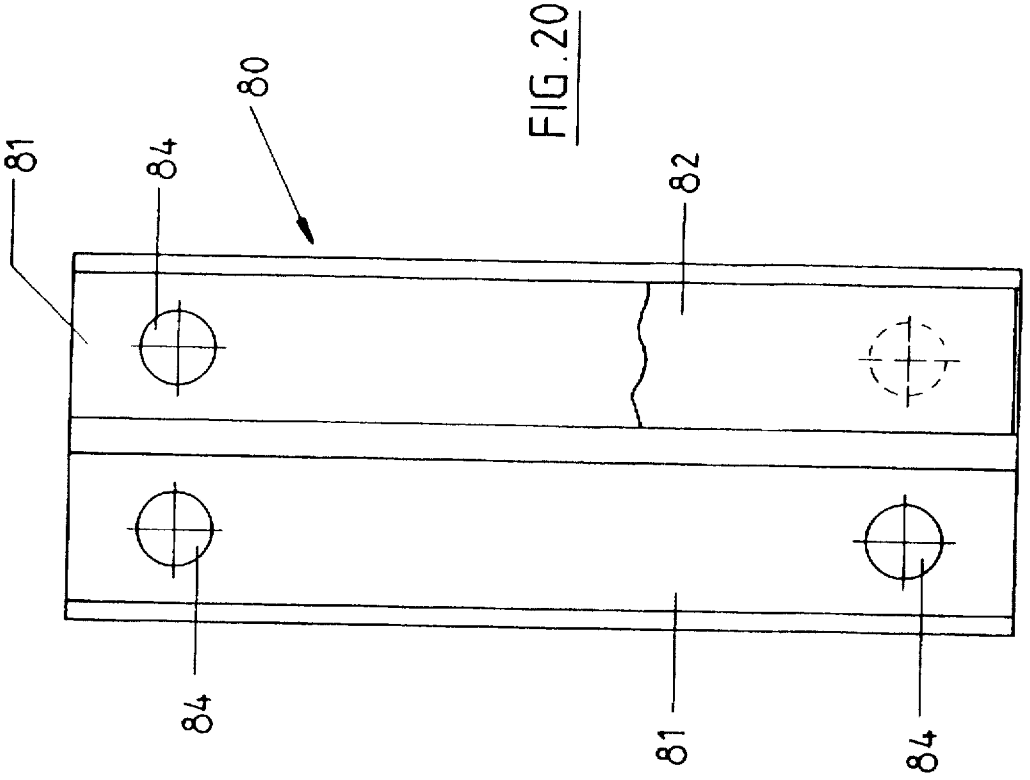
Figure 19:
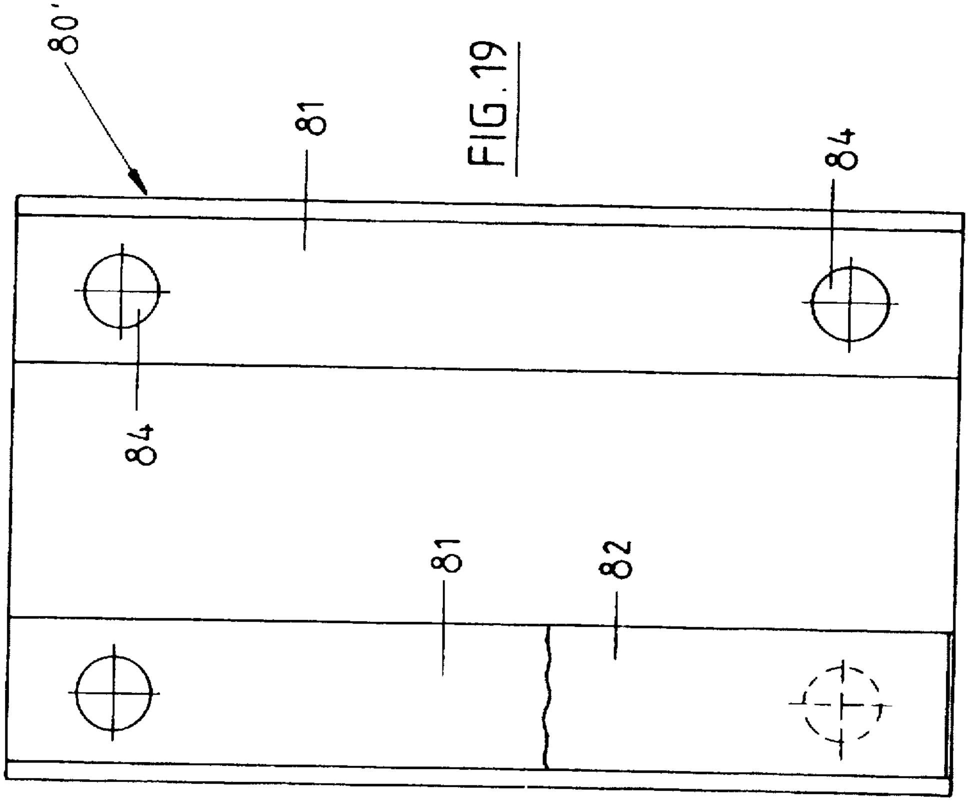

FIGS. 10 and 11 in an enlarged individual representation show one of the lifting cylinders made as a floating cylinder and acting between the intermediate carrier and the upper swivelling carrier or frame;

FIGS. 12 shows an overhead view of the lifting column of FIGS. 6 and 7;

FIGS. 13 and 14 show in an enlarged representation and in an overhead view or in a partial side representation one of the guides of the lifting column of FIGS. 6 and 7;

FIG. 15 shows a partial section through one of the guides, together with the lifting cylinder located in this guide;

FIG. 16 shows in a simplified representation and in a block diagram the triggering of the lifting cylinder;

FIG. 17 shows in a simplified representation and in a partial section one of the guides, together with a guide piece in another possible embodiment;

FIG. 18 shows in a simplified representation and in a section one of the guides together with guide elements in another embodiment; and FIGS. 19 and 20 show two guide elements of the guide of FIG. 18 in an overhead view.

DETAILED DESCRIPTION OF THE INVENTION

Figure 1:
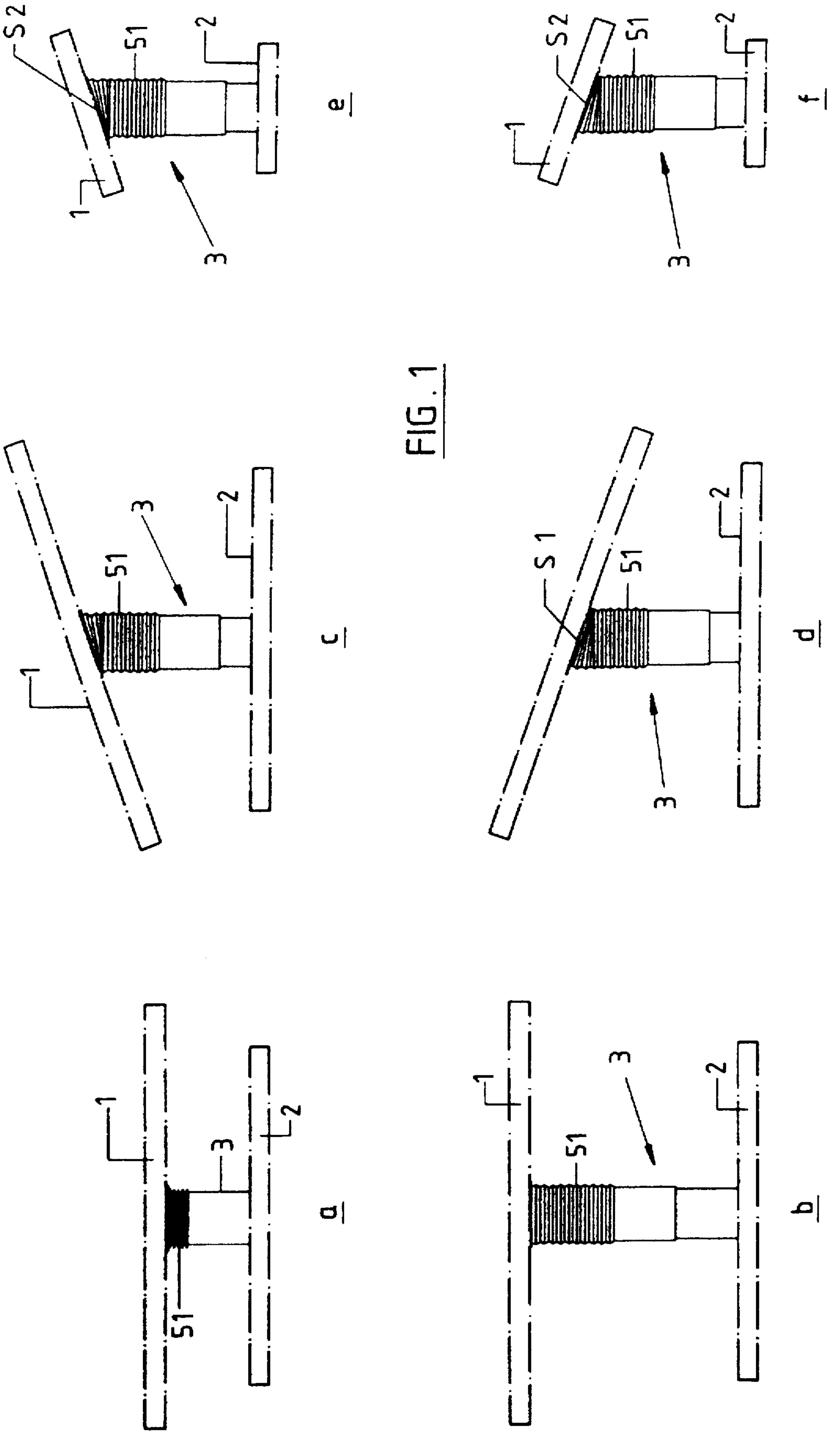
FIG. 1 shows in a simplified schematic representation and partially in a side view (positions a–d) and partially in a front view (positions e+f) a medical table with a lifting column according to the invention in different positions of the patient support.

FIG. 1 shows a patient table or patient treatment table which consists essentially of support or patient bearing surface 1, foot part 2, and support and lifting column 3 which is provided between foot part 2 and patient bearing surface 1.

Figure 2:
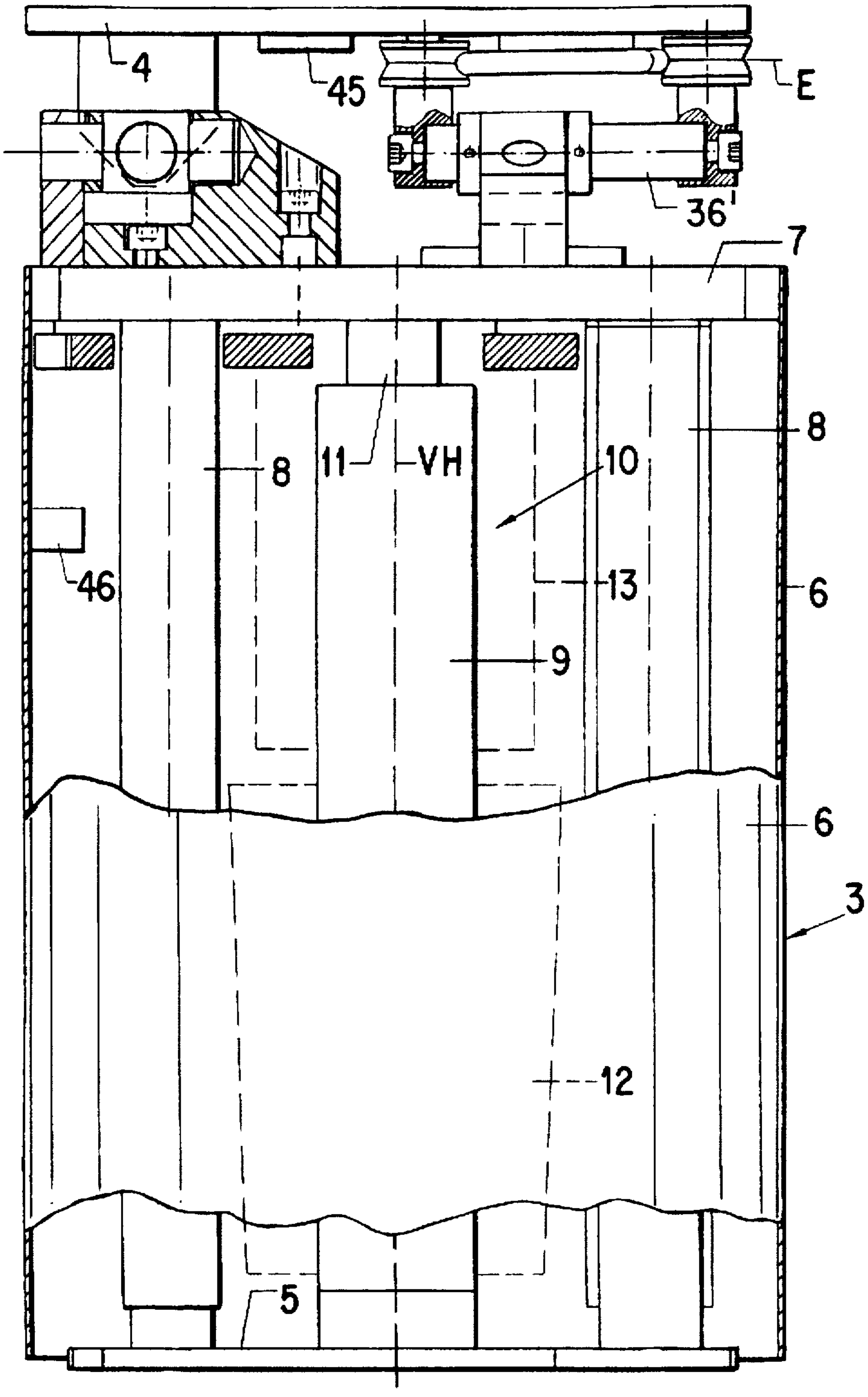
FIG. 2 shows in a simplified representation and in a longitudinal section the lifting column of the table according to FIG. 1.
Figure 3:
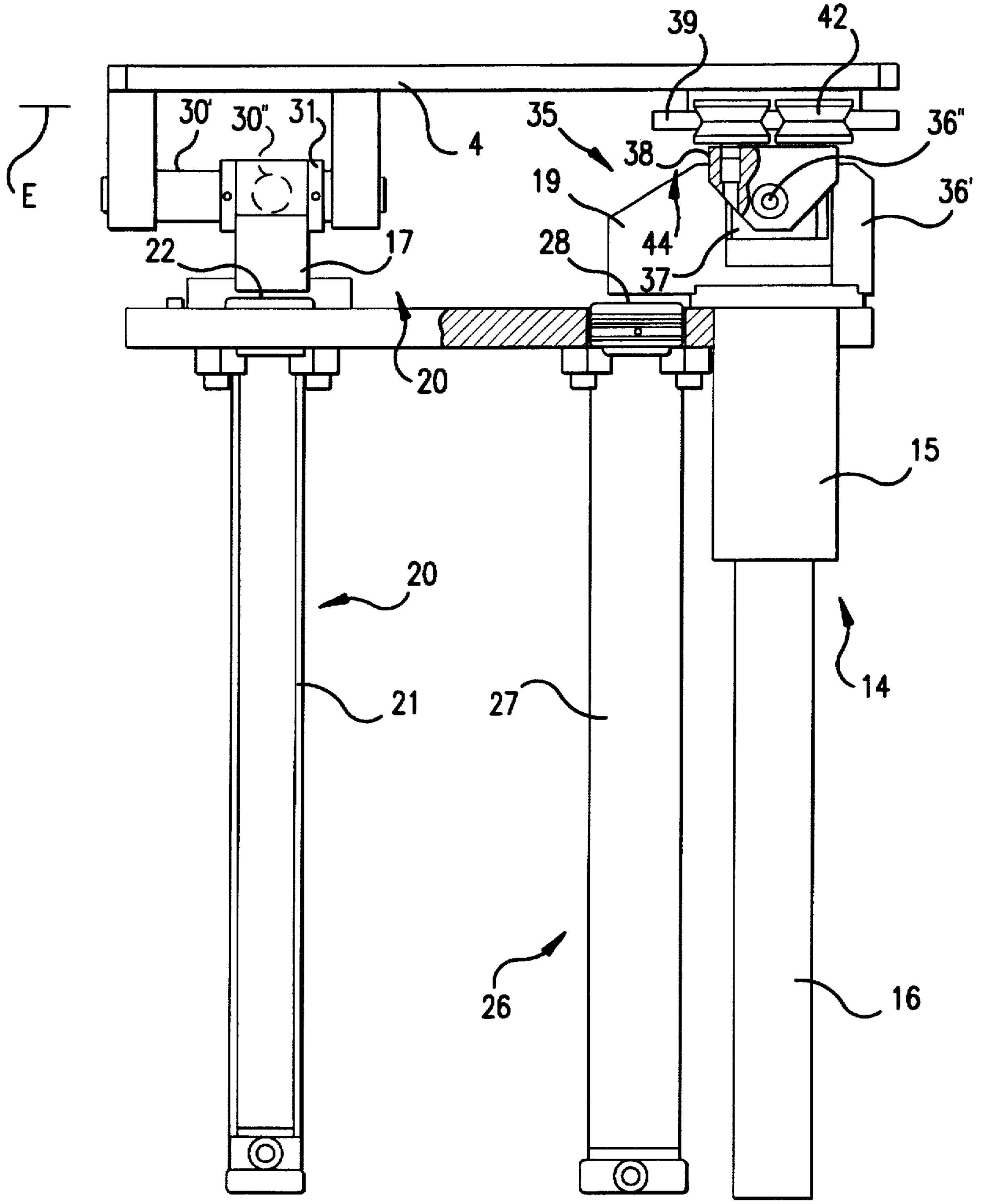
FIG. 3 shows in an individual representation the support plate of the lifting column of FIG. 2 together with the swivelling carrier provided on this support plate and with the pertinent lifting and guide element in a side view.

Lifting column 3 which is attached with its upper end or with swivelling carrier 4, which is detailed below and in FIG. 2, to the bottom of the patient bearing surface and is held with its lower end in the center of foot part 2 is used both as the load-bearing element and also for adjusting patient bearing surface 1 relative to foot part 2 and for fixing the respective adjustment or positioning of this patient bearing surface.

Adjustment includes on the one hand vertical adjustment in one vertical axis VH between a lower lift position and an upper lift position (positions a+b of FIG. 1). Furthermore, the lifting column swivelling of the patient bearing surface is possible around two horizontal axes which run perpendicularly to one another, around axis S1 perpendicular to the longitudinal axis and around axis S2 parallel to the longitudinal axis of rectangular patient bearing surface 1 (positions c–f of FIG. 1). All adjustment movements are possible individually but also combined in any way with one another. To achieve these adjustment movements in a small and compact design and with extremely high stiffness of the lifting column, this is done in an manner detailed in FIGS. 2 through 5.

Essentially lifting column 3 consists accordingly of lower horizontal support plate 5, i.e., which lies in one plane perpendicular to axis VH, with which the lifting column can be attached to foot part 2 and which has a square layout according to the cross section of lifting column 3. On the bearing plate there is housing 6 which closes lifting column 3 at least in its lower area to the outside. On support plate 5 in the direction of axis VH, i.e., in the vertical direction, upper support plate 7 is movably provided which likewise lies in a plane perpendicular to axis VH. Support plate 7 located above support plate 5 is guided with several telescoping guides 8 in axis VH on support plate 5 and/or on housing 6. In the center or roughly in the center of the lifting column cylinder housing 9 of hydraulic lifting cylinder 10 is attached to support plate 5 which engages with its piston rod 11 upper support plate 7. With lifting cylinder 10 a vertical stroke of upper support plate 7 to lower support plate 5 or to housing 6 is possible.

On support plate 7 which, like support plate 5, has a square layout and on its bottom in the embodiment shown there are the hydraulic assembly (among others with the tank for the hydraulic oil and pump) and also entire control means 13 of lifting column 3, there are three guide sleeves 15 which each form vertical guide 14 and in which one guide rod 16 at a time is guided to move in the vertical direction. There is one bearing block 17, 18 and 19 on each upper end of each guide rod 16 which projects above the top of support plate 7. Guide sleeves 15 each project with a length over the bottom of support plate 7. Guide rods 16 have a length such that these guide rods are spaced with lifting cylinder 10 retracted with their lower end away from the top of bearing plate 5.

One lifting cylinder is assigned to each guide 14 with which play-free lifting motion of pertinent bearing piece 17–19 in the vertical direction, i.e., in axis VH, is possible, and the cylinder acts between support plate 7 and pertinent bearing piece 17, 18 or 19, specifically: hydraulic lifting cylinder 20 which with its cylinder housing 21 is attached to bearing plate 7 and with its piston rod 22 which lies parallel to the axis of guide 14 engages bearing piece 17, lifting cylinder 23 which is attached with its cylinder housing 24 to support plate 7 and with its piston rod 25 engages bearing piece 18, and lifting cylinder 26 which is attached with its cylinder housing 27 to support plate 7 and with its piston rod 28 engages bearing piece 19.

Bearing piece 17 is a component of joint 29 which is provided on the bottom of swivelling plate 4 and which enables swivelling of swivelling carrier 4 around axes S2 and S2 and at the same time a stroke in axis S1. Joint 29 for this reason consists essentially of hinge pin 30' which is attached on both ends to the bottom of swivelling carrier 4, which is located with its axis in axis S2, and which can be swivelled in bearing 31 on bearing piece 17 and at the same time is supported to also move axially. Bearing 31 can be swivelled with hinge pin 30" on bearing piece 17 around axis S2.

Bearing piece 18 is a component of joint 32 which is likewise provided on the bottom of swivel plate 4 and which enables swivelling of swivel plate 4 around axes S1 and S2. Joint 32 for this reason consists of hinge pin 33' which is held on both ends on the bottom of swivel plate 4 and which is swivel-mounted in bearing 34 of bearing piece 18 around axis S1. Bearing 34 can be swivelled with hinge pin 33" on bearing piece 18 around axis S2. Joints 29 and 32 are positioned axially identically with their swivel axes S1.

Bearing piece 19 is a component of third joint 35 which in particular has the following components:

hinge pins 36' and 36"

bearing 37 joint intermediate carrier 38 guide piece or circular ring segment 39 and guide rolls 40.

Figure 4:
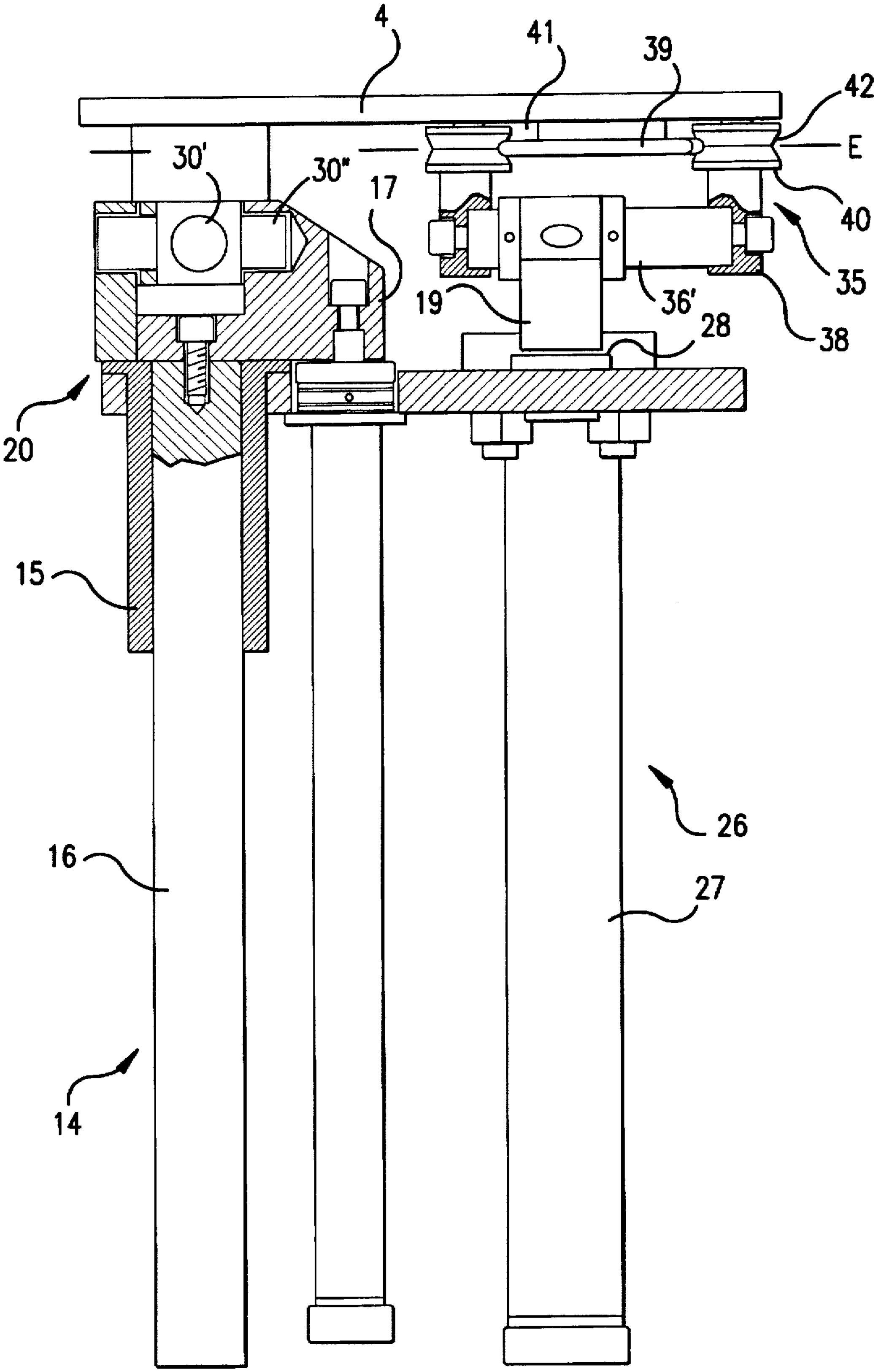
FIG. 4 shows a representation as in FIG. 3 but in a side view turned 90° relative to this Figure.
Figure 5:
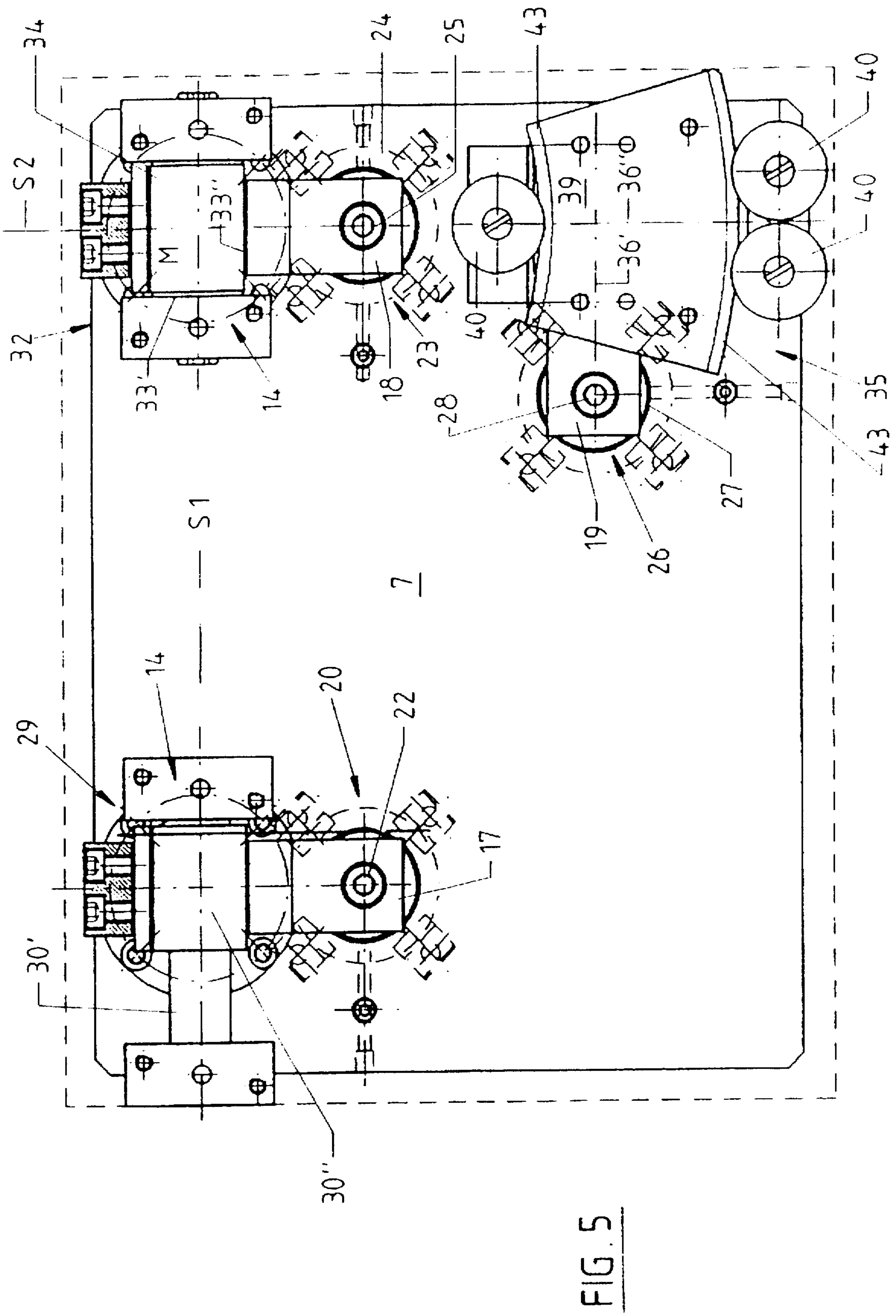
FIG. 5 shows an overhead view of the lifting column with the swivelling carrier removed.

As is shown in FIGS. 4 and 5, bearing 37 on bearing piece 19 can be swivelled around axis S1 by means of swivel pin 36'. In bearing piece 19 hinge pin 36" is supported such that it lies with its axis parallel to axis S2, can be swivelled around this axis, and can also be moved axially by a stipulated amount. Hinge pin 36" is supported on both ends in hinge intermediate carrier 38 so that it can be swivelled in the above described manner around axis S2 relative to bearing piece 19 and can be moved in this axis by a stipulated stroke. On the joint intermediate carrier, around the axes perpendicular to the plane of swivel plate 4 three guide or crank rolls 40 are supported to turn freely around axes perpendicular to plane E of circular ring segment 39, of which one guide roll 40 interacts with the inner edge and two guide rolls 40 interact with the outer circular arc-shaped edge of circular ring segment 39 which is attached to the bottom of swivelling carrier 4 via spacer plate 41, such that circular ring segment 39 lies in one plane parallel to the plane of the swivelling carrier.

As the Figures furthermore show, two external guide rolls 40 are offset relative to inner guide rolls 40 in the direction of axis S2. The rotary axis of inner guide roll 40 intersects the axis of hinge pin 36". The axes of two outer guide rolls 40 lie on either side of the axis of hinge pin 36", mirror-symmetrically with reference to this axis. As the Figures furthermore show, the axis of hinge pin 36" intersects the axis of guide 16 assigned to bearing piece 18. The projection of the point of intersection of two articulated axles 33 and 33" of joint 32 onto plane E of circular ring segment 39 is labelled M in FIG. 5 and forms the center of the radii of the outer and inner circular arc-shaped edge line of circular ring segment 39. With joint 35, therefore, swivelling around axes S1 and S2, axial motion in axis S2 and at the same time also swivelling around another axis which runs perpendicularly to plane E of circular ring segment 39 or perpendicularly to the plane of swivelling carrier 4 and passes through point M are possible. As FIG. 5 furthermore shows, joints 32 and 35 are axially identical with their S2 axes and joints 29, 32, and 35 are located in the corner areas of likewise rectangular swivelling carrier 4.

Guide rolls 40 in the embodiment shown are provided each with wedge-shaped peripheral groove 42 into which the correspondingly bevelled edges 43 of circular ring segment 39 fit so that in the axial direction perpendicular to the plane of circular ring segment 39 a form-fitted connection between this segment and joint intermediate carrier 38 is achieved.

With the described design of joint 29, 32, and 35, when these joints and guides 14 are made without play, using lifting cylinders 20, 23 and 26 swivelling carrier 4 can be raised and lowered without play in the direction of axis VH and can also be swivelled without play around axis S2 and/or S2, each time relative to support plate 7, the spacing changes which occur during swivelling between the point of intersection of the axis of guide 14 of hinge 29 and the point of intersection of guide 14 of hinge 35 each being equalized with plane E by additional swivelling or crank guide 44 of joint 35 formed by circular ring segment 39 and the pertinent guide rolls 40.

A slope sensor which is labelled 45 records the slope of swivelling carrier 4 around two horizontal axes S1 and S2 and delivers a corresponding signal to control means 13 so that using this slope sensor the slope desired at the time can be accurately set, i.e., lifting cylinders 20, 23 and 26 can be controlled accordingly. Another sensor 46 is assigned to lifting motion VH of lifting cylinder 10 and its signal is likewise supplied to control means 13 so that lifting cylinder 10 of the setting of swivelling carrier 4 desired at the time can be controlled accordingly via the control means.

FIGS. 6–16 relate to another possible embodiment of lifting column 3a according to the invention which corresponds in terms of its fundamental embodiment to the lifting column of FIGS. 2–5 and in turn has four lifting cylinders, specifically lifting cylinder 10a which acts between foot part 50, with which lifting column 3a is attached to the floor, and intermediate carrier 7a which corresponds to upper support plate 7 in function, as well as three lifting cylinders 20a (corresponding to lifting cylinder 20), 23a (corresponding to lifting cylinder 23) and 26a, which act between intermediate carrier 7a and the upper swivelling carrier or frame 4a, cylinder 26a being designed as a floating cylinder as is detailed below.

One guide is assigned to each of lifting cylinders 10a, 20a, and 23a, vertical guide 8a to lifting cylinder 10a for moving intermediate carrier 7a up and down, vertical guide 14a to lifting cylinder 20a for moving joint 29a provided on the upper end of lifting cylinder 20a, and vertical guide 14a for lifting cylinder 23a or for vertical movement of joint 32a relative to intermediate carrier 7a.

In FIGS. 6–15, for lifting column 3a those components which are comparable in terms of basic function to the components of lifting column 3 are each labelled with the reference numbers of FIGS. 2–5 and the additional suffix "a".

In contrast to lifting column 3a, guides 8a and 14a are each executed such that each guide consists of two hollow sections of metal, preferably steel, which are made tubular with a rectangular cross section, specifically guide 8a of inner section 51 and outer section 52 and two guides 14a each of inner section 53 and outer section 54. In this embodiment sections 51 and 52 are each larger than sections 54 and 53. But it is also fundamentally possible to execute all guides 8a and 14a identically, i.e., for these guides to use the same outer section and the same inner section.

In guide 8a inner section 51 is guided to move in somewhat larger outer profile 52 in the manner of a telescope. Inner section 51 is a component of foot part 50. Outer section 52 is a component of intermediate carrier 7a.

In order to obtain guidance between two sections 51 and 52 with as little play as possible, on outer section 52 in the area of the lower end of this section there are adjustable guide pieces 55 three-dimensionally offset against one another, as is shown in FIGS. 13 and 14 for guides 14a in which guide pieces 55 are located however on the upper end of outer section 54 at the time.

There are a total of six guide pieces 55 on each side of the outer section, each in the area of the corners of this section such that guide pieces 55 on each side form three pairs with two guide pieces 55 which are offset in the axial direction of pertinent guide 8a or 14a. Guide pieces 55 which are made preferably of hard metal, for example, of bronze, are made like a stud screw and are each located in one threaded hole of outer section 52 or 53 so that these guide pieces 55 can be set such that they form with their inner flat faces a guide without play for inner section 51 and 53. Guide pieces 55 are secured by locknuts 56.

Guide pieces 55 are also adjusted such that the axes of outer section 52 or 54 and of inner section 51 or 53 are as flush as possible. It goes without saying that the axes of sections 51–54 are each oriented in the horizontal direction, i.e. in the lifting direction of lifting cylinders 10a, 20a, 23a. Outer sections 54 of guides 14a are a component of intermediate carrier 7a. Inner sections 53 of guides 14a on their upper end bear respective joint 29a which has the degrees of freedom described for joint 29 (swivelling around axes S1 and S2 and shifting in the direction of axis S1), or joint 32a which likewise has the degrees of freedom described for joint 32 (swivelling around axes S1 and S2).

One particular of lifting column 3a consists in that lifting cylinders are each located within the pertinent guide, i.e., lifting cylinder 10a within the space enclosed by sections 51 and 52, the piston rod of lifting cylinder 10a being joined to lower plate 57 which at least partially closes section 51 on the lower end and which forms foot part 50, and the cylinder housing of lifting cylinder 10a being joined to upper plate 58 which is provided on the upper end of outer profile 52 and at least partially closes it. Similarly, the cylinder housings of lifting cylinders 20a and 23a are each attached to lower plate 57 which is provided on the lower end of outer profile 54 and which at least partially closes this end, while the piston rod engages upper plate 58 which is provided on the upper end of inner section 53 and on which respective bearings 29a and 32a are also mounted.

The piston rods and cylinder housing are attached to plates 57 and 58 such that there is a rigid connection, but axial equalization or swivelling around the respective connection point is possible in order to equalize a possible axial offset between the inner and outer section during lifting and lowering. This attachment is shown by way of example in FIG. 15 for piston rod 25a of lifting cylinder 23a. Attachment takes place using two spherical disks 59 which are provided on the two sides of upper plate 58 in the area of attachment hole 60 and which abut upper plate 58. Against the surfaces of disks 59 which face away from plate 58 and which are convexly curved in the manner of a spherical surface there lie the correspondingly concavely curved surfaces of disks 61, of which one with its flat side abuts the head of axial attachment screw 62 and the other with its flat side abuts the upper end of piston rod 25*a* which is provided with a threaded hole for attachment screw 62. The diameter of hole 60 is somewhat greater than the diameter of attachment screw 62 so that disks 59 and 61 form a ball joint which enables swivelling motion of attachment screw 62 around all axes which lie in the planes of plate 58.

Inner sections 51 and 53 are made to be very accurate to size and flat at least on their surfaces which interact with guide pieces 55; this can be achieved either by the corresponding precision in the manufacture of these sections or by subsequent surface working, for example, by grinding.

Another particular of lifting column 3*a* consists in that hinge pin 63 which enables swivelling of joints 29*a* and 32*a* around axis S1 is made continuous, by which on the one hand additional stability arises and at the same time it is also ensured that the S1 axes of two joints 29*a* and 32*a* necessarily lie axially identically. On hinge pin 63 are bearing pieces 64 which can swivel around axis S1. These bearing pieces inherently form the upper plane or upper connection of lifting column 3*a* on which the function element born by the lifting column can be mounted, for example, patient table 1 or a frame of this table or the swivelling carrier or frame labelled 4*a* in FIGS. 6–9, but which can be part of the frame of patient table 1.

On intermediate carrier 7*a* are hydraulic assembly 65 and control unit 66.

For lifting column 3*a*, joint 35 of lifting column 3, the joint made as a swivelling-sliding and rotary joint, i.e., as a joint for equalization of axial distances, is replaced by lifting cylinder 26*a* made as a floating cylinder. This yields an especially simple and very stiff structure.

Figure 9:
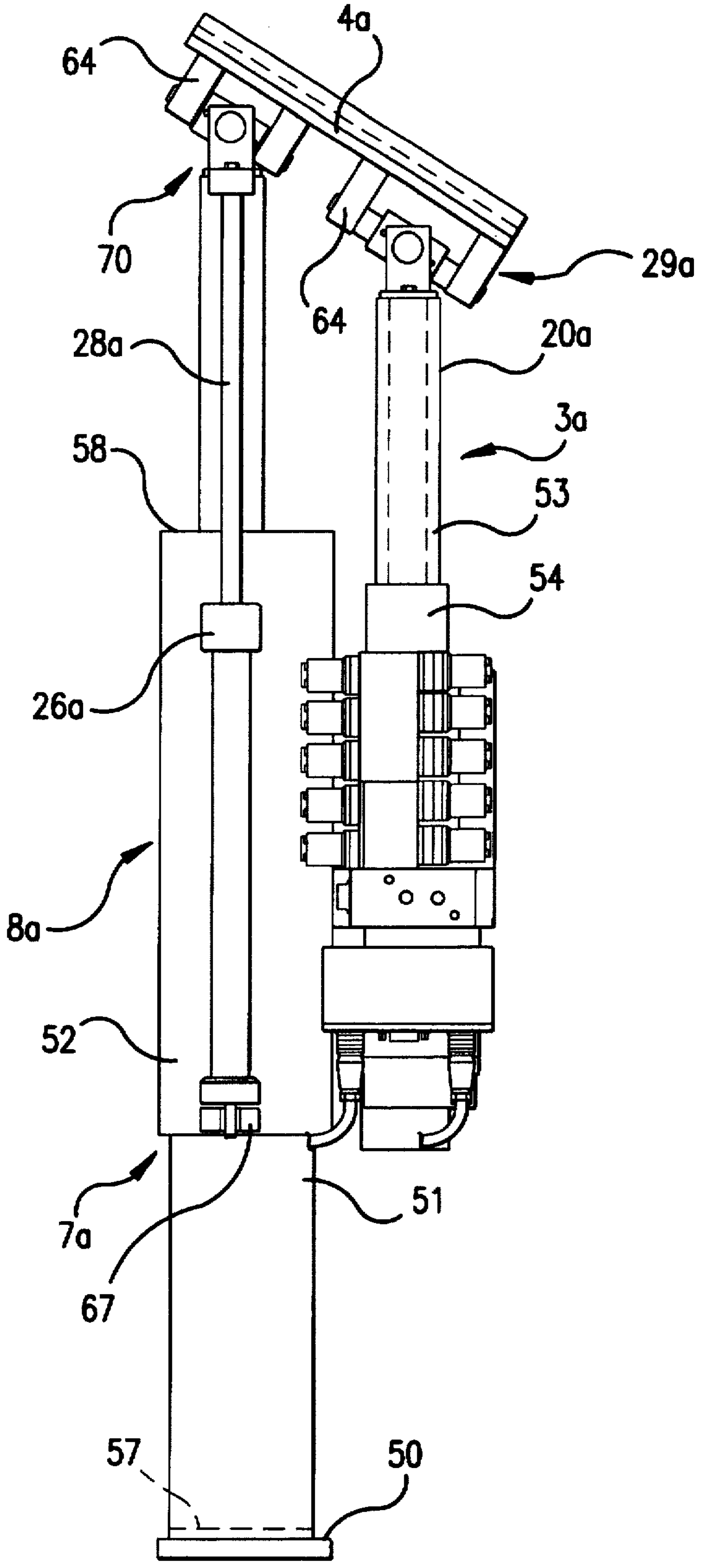

As FIGS. 9–11 show in particular, the lower end of cylinder housing 27*a* of lifting cylinder 26*a* is attached to intermediate carrier 7*a* and in doing so especially to the lower end of outer section 52, specifically between the two arms of a fork-like jib or bearing element 67 by means of hinge pin 68 which lies with its axis in axis S1, but is also curved at the same time like a spherical surface on the area encompassed by cylinder housing 27*a* or bearing eye 69 there, so that not only swivelling of cylinder housing 27*a* around the axis of hinge pin 68, i.e., around axis S1, but also lateral floating or swivelling around horizontal axis S2 and around a vertical axis which is perpendicular to axes S1 and S2, are possible.

Piston rod 28*a* of lifting cylinder 26*a* bears joint 70 which is made as a universal or cardan joint, with two degrees of freedom or swivelling axes which lie perpendicular to one another and also perpendicular to the longitudinal axis of lifting cylinder 26*a*. Joint 70 in turn has bearing piece 64 to which the structure born by lifting column 3*a*, for example swivelling carrier 4*a*, is attached. At least with the lifting cylinder retracted, one axis of joint 70 is parallel to axis S1 and one axis is parallel to axis S2.

As FIG. 12 shows, the arrangement is made furthermore such that for two guides 14*a* the longer cross sectional sides of sections 53 and 54 are perpendicular to axis S1 and for guide 8*a* the longer cross sectional sides of sections 51 and 52 are perpendicular to axis S2. Furthermore, relative to an imaginary vertical center plane M of sections 51 and 52 which lies parallel to the larger cross sectional sides of these sections, two guides 14*a* are located on one side of this center plane M and lifting cylinder 26*a* made as a floating cylinder on the other side of the center plane. Axis S1 for lifting column 3*a* coincides with the longitudinal axis of patient table surface 1 and axis S2 with the transverse axis.

The described design and arrangement especially of the sections which form guides 8*a* and 14*a* for lifting column 3*a* yield a construction which can be economically produced as a welded structure and which is also very rigid and distortion-resistant.

One special advantage consists among others in that guides 8*a* and 14*a* are each formed around the pertinent lifting cylinders, i.e., these guides can be made with a large diameter for low overall dimensions of lifting column 3*a*; this is of decisive importance for the desired connection stiffness of the lifting column.

By means of lifting cylinder 26*a* made as a floating cylinder complex joint 35 is eliminated. This yields not only a simplified construction, but any additional play which is inevitable in lifting column 3 due to circular ring segment 39 and the pertinent guides is effectively prevented.

FIG. 16 again shows the triggering of individual lifting cylinders 10*a*, 20*a*, 23*a* and 26*a* and control unit 66 used for this purpose with the electromagnetically activated control or hydraulic valves 71 there, via which the individual lifting cylinders or the working spaces formed by them (piston spaces and ring spaces) can be controlled such that the movements described above for lifting column 3 in conjunction with FIG. 1 are also possible with lifting column 3*a*.

One particular consists in that on the working spaces of lifting cylinders 20*a*, 26*a* and 23*a*, i.e., directly on the connections there and on the cylinder housing, there is one controllable valve 72 each, with which the pertinent connection can be closed (in this regard also FIG. 15). By means of this valve 72 which can be electrically or hydraulically controlled, for example, the connection of the pertinent working space is closed such that hydraulic fluid cannot flow out of this working space even under the influence of loads which are acting on lifting column 3*a*. This likewise contributes heavily to the stiffness of the lifting column. Control valves 72 can for example be hydraulically controlled via control connection X. Basically it is also possible to make valves 72 electrically controllable. In this embodiment valves 72 are check valves which can be isolated and which in the inactive state enable flow of hydraulic fluid into the respective working space, but which block for a flow in the reverse direction. By activation, these valves 72 can be opened, controlled also for the flow in this reverse direction.

FIG. 17 shows as another possible embodiment guide piece 55*a* which differs from guide piece 55 in that it is made in two parts. Each guide piece 55*a* which can be used instead of guide piece 55 consists of helical body 73 made as a screw, preferably from metal, which is screwed in the corresponding threaded hole of outer section 52 or 54 of corresponding guide 7*a* or 14*a*. On the inside end of helical body 73 sits disk 74 which forms the actual guide and which is made of a plastic which can be heavily loaded and which is wear-resistant; the disk, with concave surface 75 which is curved in the manner of a spherical cap, abuts a corresponding convexly curved surface of helical body 73 so that swivelling of disk 74 in the manner of a ball joint is possible such that it then rests flat against the guide surface on inner section 51 or 53. Via the two spherical cap surfaces which fit into one another a connection which transfers force is produced between helical body 73 and disk 74. For additional safety there is clip-like connection element 76 which fits through an opening 77 of the helical body into opening 78 of disk 74, the opening forming an undercut.

Guide piece 55*a* not only has the advantage that the plastic disk improves the sliding and guidance properties and the spherical cap-like connection ensures a flat bearing surface of disk 74, but the design of guide piece 55*a* also prevents moments which could cause twisting of the helical body 73 and thus drift of the set adjustment from acting on this helical body. Thus locknuts 56 can be fundamentally omitted. It is simply necessary to thread helical body 73 and the pertinent threaded hole such that twisting of the helical body requires a greater moment.

FIG. 18 again shows a section through one of the guides with two telescoping sections 51 and 52 and 53 and 54. Instead of guide pieces 55 and 55*a*, there are guide elements 79 or 79', specifically two guide elements 79 on the two narrow sides of rectangular sections 51 and 52 47X and two guide elements 79' on the two larger cross sectional sides of the rectangular sections.

Each guide element 79 consists of plate 80 which has a rectangular layout and which is located with its longitudinal extension parallel to the longitudinal axis of the pertinent guide. Plate 80 is provided on one side with two parallel groove-shaped recesses 81. Strip-shaped slide coating 82 of a suitable material is cemented into each groove or recess 81 such that each slide coating 82 with its longitudinal extension is parallel to the longitudinal axis of the guide and abuts with one slide surface the outer surface of inner section 51 or 53. On plate 80 there are four openings 84, two openings each on each narrow side of this plate and with the same distance from the pertinent narrow side. Openings 84 are located in this embodiment each in the area of the grooves and form two pairs of openings which are offset against one another in the longitudinal direction of the guide.

Plate 80 lies with its back facing away from recesses 81 against the inner surface of outer section 52 or 54. On outer section 52 or 54 for each guide element 79 there are four threaded holes in which there is one helical body 85 each, which with its axis is perpendicular to the longitudinal direction of the pertinent guide and on its side facing inner section 51 or 53 is provided with a trunnion-like projection 86 which fits into opening 84. Helical bodies 85 furthermore lie with their surface which surrounds respective projection 86 against the back of plate 80. As shown, for this reason the diameter of helical body 85 is much greater than the diameter of projections 86. Projections 86 fix respective plate 80 in its position. Two guide elements 79' are made in the same way as guide element 79, but using plate 80' which has a greater width than plate 80.

Using helical bodies 85, plates 80 or 80' can be adjusted relative to respective inner section 51 or 53 and thus also sliding coating 82 relative to this inner section and thus the play of the respective guide can also be adjusted.

The sliding motion for example of inner section 51 or 52 on sliding coatings 82 does not exert any moments on helical bodies 85 which could cause undesirable loosening or tightening of these helical bodies. Thus the helical bodies need not be secured.

Plates 80 or 80' and helical bodies 85 are made of metal, preferably steel, and the slide coatings preferably of a high-strength plastic or metal-plastic material, thus preventing metallic contact and yielding very quiet and good sliding behavior. Another advantage of the sliding plate system formed by guide elements 79 and 79' consists in the possibility of simple centering of the inner and outer section and in low adjustment cost when the guides are adjusted. By means of these guide elements 79 and 79' is it possible to use commercial, unworked steel sections for the respective guide or for the inner and outer section and thus obtain a structure resistant to distortion with optimum sliding behavior and low friction at low cost. Guide elements 79 and 79' are preferably produced such that the slide coating are glued into grooves 81 over their surfaces. Then the two slide coatings 82 are reworked, for example remilled, such that they then have completely flat slide surfaces which lie in a common plane parallel to the plane of respective plate 80 or 80'.

An actuator labelled 87 in FIG. 18, preferably a hydraulic cylinder, is provided on the outer surface of outer section 52 or 54 and with piston rod 88 can act through an opening of the outer section and an opening of plate 80' on plate-shaped clamp element 89 which acts on inner section 51 when cylinder 87 is activated, such that this section is locked on outer section 52 or 54. Using a control means of the lifting column cylinder 87 is controlled such that normally it is in the deactivated state and is only activated when the lifting cylinder assigned to the guide has reached a stipulated position, i.e. this lifting cylinder does not move.

The invention was described above using one embodiment. It goes without saying that changes and modifications are possible without departing from the inventive idea underlying the invention. In particular, the additional swivelling possibility can also be produced by a swivelling guide which differs from swivelling guide 44. In contrast to the described embodiment, it is also possible to build swivelling carrier 4 as a frame element. Furthermore, swivelling carrier 4 can also be a component of a table or support.

What is claimed:

1. A lifting column for patient tables for industrial applications, having at least one lifting cylinder designated as a hydraulic cylinder for at least one vertical stroke and with at least one guide for guiding at least one lifting cylinder in a direction of said vertical stroke of said lifting cylinder, said at least one guide being separate from said hydraulic cylinder, wherein said at least one guide comprises two telescoping sections which are tubular and have a non-circular cross section, an axis of each of said two telescoping sections lying in a direction of said stroke (VH), said at least one lifting cylinder is housed within said two telescoping sections of said at least guide and at least one of said two telescoping sections which form said at least one guide has guide pieces formed thereon, said guide pieces abut an outer surface of a second one of said telescoping sections, said guide pieces being 3-dimensionally off-set against one another and being adjustable in an axial direction perpendicular to said outer surface in order to obtain sliding guidance between said two telescoping sections with as little play as possible.

2. A lifting column according to claim 1, wherein said guide is located within one of said tubular telescoping sections and a space surrounded by said tubular telescoping sections.

3. A lifting column according to claim 1, wherein at least one of telescoping sections has guide pieces which, interact with a surface other one of said telescoping sections, and which can be adjusted perpendicular to said surface.

4. A lifting column according to claim 3, wherein said guide pieces are each helical with an external thread which fits into a thread of a threaded hole in said at least one section on which guide pieces are provided.

5. A lifting column according to claim 1, further comprising a controllable valve disposed on said at least one cylinder for blocking a hydraulic connection.

6. A lifting column according to claim 1, wherein each of said lifting cylinders has a piston rod, and is attached to swivel on said telescoping sections which form said guide for equalization of axial displacements.

7. A lifting column according to claim 1, wherein said telescoping sections which form said guide are made of steel.

8. A lifting column according to claim 3, wherein said guide pieces are made of bronze.

9. A lifting column according to claim 3, wherein said guide pieces are each made in two parts and comprise a body held in one of said telescoping sections, and a guide disk connected to said body by a ball joint connection.

10. A lifting column according to claim 9, wherein said guide disk is made of wear-resistant plastic which can withstand high loads.

11. A lifting column according to claim 1, wherein between said telescoping sections are guide elements which form a slide plate system, each of said guide elements comprising at least one plate which is held adjustably on an outer one of said telescoping sections by screw-like adjustment elements disposed perpendicular to a direction of movement of said guide elements, and wherein said at least one plate comprises on a side facing a respective inner one of said telescoping sections at least one slide surface, formed by at least one slide coating.

12. A lifting column according to claim 11, wherein each of said at least one plate is held with at least two screw-like adjustment elements.

13. A lifting column according to claim 1 further comprising at least one clamping means on said at least one guide for clamping said telescoping sections.

14. A lifting column according to claim 13, wherein said clamping means is formed by a hydraulic cylinder.

15. A lifting column according to claim 1, wherein said two telescoping sections each have a rectangular cross section formed by four wall portions forming said surface, with each wall portion of a second one of said two telescoping sections resting against one of said guide pieces.

* * * * *